No. 726,484. PATENTED APR. 28, 1903.
L. E. WARREN.
MEANS FOR TEACHING READING OF THE FACIAL EXPRESSIONS WHICH OCCUR IN SPEAKING.
APPLICATION FILED FEB. 26, 1902.
NO MODEL. 3 SHEETS—SHEET 1.
Attest: Inventor:
Lillie Eginton Warren.
by Ellis Spear
Att'ys No. 726,484. PATENTED APR. 28, 1903.
L. E. WARREN.
MEANS FOR TEACHING READING OF THE FACIAL EXPRESSIONS
WHICH OCCUR IN SPEAKING.
APPLICATION FILED FEB. 26, 1902.
NO MODEL. 3 SHEETS—SHEET 2.

No. 726,484. PATENTED APR. 28, 1903.
L. E. WARREN.
MEANS FOR TEACHING READING OF THE FACIAL EXPRESSIONS WHICH OCCUR IN SPEAKING.
APPLICATION FILED FEB. 26, 1902.
NO MODEL. 3 SHEETS—SHEET 3.
Inventor
Lillie Eginton Warren

UNITED STATES PATENT OFFICE.

LILLIE EGINTON WARREN, OF NEW YORK, N. Y.

MEANS FOR TEACHING READING OF THE FACIAL EXPRESSIONS WHICH OCCUR IN SPEAKING.

SPECIFICATION forming part of Letters Patent No. 726,484, dated April 28, 1903.

Application filed February 26, 1902. Serial No. 95,794. (No model.)

*To all whom it may concern:*

Be it known that I, LILLIE EGINTON WARREN, a citizen of the United States, residing at New York city, State of New York, have invented certain new and useful Improvements in Means for Teaching the Reading of the Facial Expressions which Occur in Speaking, of which the following is a specification.

My invention relates to improved means for teaching the reading of the facial expressions which occur in speaking. It assumes that the learner understands the language and at some period of his life has heard it spoken, so that he retains in his memory the elementary sounds of which the words of the language are composed; and the object of my system is to teach him to associate these elementary or substantially elementary sounds with the special expression of the human face which invariably accompanies the utterance of such sounds. It includes a series of pictures of the human face in which separately substantially every expression is shown which the face assumes in uttering the series of elementary sounds used in speaking the language, and it also includes with this series of pictures a series or schedule of characters, marks, or symbols, one for each picture and expression, each arbitrary character referring to its appropriate picture. In this system as used in teaching marks or symbols the characters or groups of three represent words in the schedule in collocation with the words which they represent, so that the learner looking at any given word in the schedule sees therewith the characters in proper or corresponding order which represent the vocal elements of the word, and these characters representing the said elements refer him to the specific pictures which show the facial expression corresponding thereto and invariably accompanying the utterance of the sound which the symbol represents. Thus this invariable element of expression which accompanies utterance of any vocal sound has its fixed relation to the elements of the printed word, and when these facial expressions and the syllable or sounds appropriate to every symbol specifically are fixed in mind—that is to say, when the scholar has learned the lesson, when he knows what each facial expression means in terms of sounds composing words—he can read upon his face what the speaker is saying. Thus the eye translates into words the rapidly-occurring facial expressions of the speaker just as the ear translates into words the swiftly-changing aerial vibrations which are caused by the speaker to act thereon. The observer taught by my system hears with his eyes just as another hears with his ears. I do not, as a matter of course, pretend to be the first to discover the meaning of a speaker by observing the changing expressions of his face. I have herein presented only a method or system and provided means whereby those who have wholly or materially lost the power of hearing may certainly and completely learn to read such expressions.

In order that my method and the material or mechanical means used therein may be fully understood, I have explained the details thereof as applied to the English language. I have also illustrated these means in the accompanying drawings, in which—

Figure 1 represents a picture of the facial expressions accompanying the utterance of letters "w," "wh," long and short "oo," and the appropriate mark "1" placed beneath the figure. Fig. 2 represents that accompanying the utterance of consonants "y," long "e," and short "i" with appropriate numeral "2." Fig. 3 represents expression of broad "a," "i," "e," "ah," and short "o" with appropriate mark "3." Fig. 4 shows expression accompanying letters "f" and "v" and the mark "4." Fig. 5 shows expression of "th" and the mark "5" underneath. Fig. 6 shows expression of "sh," soft "ch," soft "g," and "j" and the mark "6" therefor. Fig. 7 shows expression of letters "p," "b," and "m" and the mark "7." Fig. 8 shows expression of letter "l" and its mark "8." Fig. 9 shows expression of letter "n" and its mark "9." Fig. 10 shows expression of "r," "ur," and short "u" and the appropriate mark "10." Fig. 11 shows expression representing sound represented by letters "aw" and the mark "11" belonging thereto. Fig. 12 illustrates expression of letters "t" and "d" and the appropriate mark "12" below. Fig. 13 represents expression of short "a" and short "e" and has the numeral "13."

Fig. 14 represents expression of "k" and "g" hard and "ng" and the mark "14" therefor. Figs. 15 and 15ᵇ illustrate the expression accompanying the utterance of long "a." They have, respectively, the marks of "15ᵃ" and "15ᵇ." Fig. 16 shows the expression accompanying utterance of letters "s" and "z" and the mark "16" therefor. Fig. 17 illustrates the collocation of letters and the marks appropriate thereto in proper order to represent the sounds of a sentence hereinafter mentioned.

For sake of clearness I have hereinafter referred to the figures as "pictures," with their appropriate marks.

There are more than forty distinct sounds in this language. I have discovered that these sounds when uttered reveal themselves in seventeen distinct outward manifestations or facial expressions, and every one of these sounds is invariably accompanied by its appropriate special expression. These expressions are portrayed in as many pictures, which are shown in the accompanying drawings. Every one of the pictures of these drawings has its peculiar arbitrary character. For this identification I prefer to use the Arabic numerals; but other characters may be used instead. These pictures constitute the facial alphabet, visible always on the face of the speaker, but represented in the pictures as means of instruction. They are shown in the accompanying drawings, in which the pictures representing the various expressions from 1 to 16 are shown. They are herein referred to in order, together with the schedule of sounds they represent indicated by the same numbers and the groups of numbers indicating words.

The first expression is shown in Fig. 1, which is marked "1." This is the expression accompanying the utterance of the sounds represented by "w," "wh," long "oo," and short "oo," and I call this the "round mouth." Wherever in the exercises the character "1" occurs the reader is directed to Fig. 1 for illustration of the expression for that sound.

The second expression is in Fig. 2, the long mouth, as in uttering the sounds represented by letters consonant "y," long "e," and short "i." Combining the two illustrations we take "1.2," representing "we," and the reader, referring to pictures 1 and 2, will note the expresssion pertaining thereto. In like manner he may translate into expression the numbers "2.1," representing "you," and note the successive facial expressions. These he may experiment upon by pronouncing the words before a glass, observing attentively the expressions on his own face.

The third expression, appearing in picture 3, shows the distinctive open mouth. This expression accompanies the utterance of the sounds represented by broad "a"—i. e., "ah"—and short "o." Combining for illustration we take "3.2," representing "I," and the reader, referring to the pictures 3 and 2 and watching his own face in the mirror, will see how these two expressions are combined when thus sounding "I."

The fourth expression, appearing in picture 4, shows the lower lip touching the upper teeth, as in uttering the sounds represented by the letters "f" and "v." Combining for illustration we take "4.2," representing "fee," and the reader, referring to the pictures 4 and 2 and watching his own face in the mirror, will see how these two expressions are combined when forming this word.

The fifth expression, appearing in picture 5, shows the tongue just between the teeth, as in uttering the sound represented by the letters "th." Combining for illustration we take "5.2," representing "thee," &c.

The sixth expression, appearing in picture 6, shows the lips in a distinctively-square appearance and slightly protruded, as in uttering the sound represented by the letters "sh," soft "ch," soft "g," and "j." For illustration we take "6.1," representing "shoe," &c. In like manner also "6.3.1-6.3.1," representing "chow-chow."

The seventh expression shows the lips lightly closed, as in picture 7, and this expression accompanies the sounds represented by the letters "p," "b," and "m.". For illustration we take "7.2," representing "pea" or "be" or "me," &c.

The eighth expression, appearing in picture 8, shows the point of the tongue touching the upper gum and the teeth somewhat separated, as in uttering the sound represented by the letter "l." For illustration we take "8.3.2," representing "lie," &c.

The ninth expression, appearing in picture 9, shows the entire edge of the tongue placed to the upper gum, with the teeth rather close together, as in uttering the sound represented by the letter "n." For illustration we take "9.3.1," representing "now," &c.

The tenth expression, appearing in picture 10, shows the lips in a distinctively-oval shape, with the corners of the lower lip and the chin slightly thrust forward. This expression accompanies the utterance of the sounds represented by the letter "r," by "ur," (whether accented or unaccented,) and by short "u," (accented or unaccented.) For illustration, we take "10.1," representing "rue," &c., in like manner also "4.10," representing "fur," and also "4.10.9" representing "fun."

The eleventh expression, appearing in picture 11, shows the lips in a distinctively-triangular shape, the lower lip forming the base of the triangle. This expression accompanies the sound represented by the letters "aw"—for illustration, "11.8" representing "awl," &c. This expression combined with "2," thus "11.2" accompanies the sound represented by the letters "oy" or "oi"—for illustration, "7.11.2" representing "boy." This expression again combined with "1," thus "11.1,"

accompanies the sound represented by long "o"—for illustration, "1.11.1" representing "woe."

The twelfth expression, appearing in picture 12, shows the lips and teeth in a position like to that in picture 9. If this expression be followed by a slight downward jerk of the lower jaw, the face will show the expression that accompanies the sounds represented by the letters "t" and "d"—for illustration, "1.2.12" representing "wit," &c.

The thirteenth expression, appearing in picture 13, shows the mouth open, but not so widely as in picture 3, and shows the tongue prominent in the front of the mouth. This expression is always made quickly and accompanies the utterance of the sounds represented by short "a" and short "e"—for illustration, "8.13.12" representing "lad," &c., in like manner also "1.13.8" representing "well."

The fourteenth expression, appearing in picture 14, shows a mouth more or less open without any distinct peculiarities, though a drawing up of the muscles under the chin will be noticed. This expression accompanies the utterance of the sounds represented by the letters "k," "g" (hard) and "ng"—for illustration, "1.2.14" representing "week," &c., in like manner also "7.2.14" representing "big" and "7.13.14," representing "bang."

The fifteenth expression appears in pictures 15ª and 15ᵇ. The mouth starts with an openposition and then relaxes. There is thus a double movement, which the pictures show by presenting the beginning (15ª) and the end (15ᵇ) of the expression. This expression accompanies the utterance of the sound represented by long "a"—for illustration, "7.15.14" representing "bake," &c.

The sixteenth expression appearing in picture 16 shows the face with a somewhat smiling character, the muscles of the lips being strained and the teeth close together. This expression accompanies the utterance of the sounds represented by the letters "s" and "z"—for illustration, "16.15" representing "say," &c., in like manner also "16.2.8," representing "zeal."

The fourteenth expression, followed by the sixteenth, accompanies the utterance of the sound represented by the letter "x"—for illustration, "4.2.14.16" representing "fix."

The expressions herein explained and only these are seen on the face when the words or sentences are sounded in the English language. One sound, that represented by the letter "h," has no expression of its own, its sole effect being slightly to prolong the expression accompanying the following vowel sound.

I have shown in Fig. 17 of the drawings the sentence, "'What powerful chains of circumstances,' said the wise old chief," together with the marks appropriate to each expression properly located above the letters and illustrating the expressions above described.

It is apparent that these illustrations might be extended to include any word in the language, the same series of pictures shown herewith being sufficient therefor and supplying the clue to any word.

I am aware that it is not new to use a series of cards bearing a series of facial expressions each in connection with its appropriate letter of the alphabet, as in the United States Patent of Kingma No. 660,225; but it will be observed that my system and apparatus differ from that of Kingma in this important respect: I do not apply the letters of the alphabet to each picture, but have adopted a more simple system and means in which the facial expression may represent a variety of letters or combination of letters—as, for example, the expression shown in Fig. 1 represents "w," "wh," long "oo," and short "oo"—and I attach to this more generalized system of pictures representing expressions arbitrary signs, which arbitrary signs may be placed in proper relation to any one of the various letters or combination of letters belonging to the particular expression.

I claim as my invention—

An improved means for teaching the reading of expressions accompanying the utterance of speech, the same consisting of a series of pictures of the human face, such pictures representing respectively the various expressions occurring in the utterance of the elementary sounds composing words, said pictures bearing each its appropriate arbitrary mark; in combination with a schedule of such marks singly or in groups, each of said marks or groups being in collocation with the word, the element or elements of which are indicated by the said marks appropriate to the expressions they indicate, all substantially as described.

In testimony whereof I affix my signature in presence of two witnesses.

LILLIE EGINTON WARREN.

Witnesses:
EDWARD BARTLETT NITCHIE,
BERNARD FARRELL.